UNITED STATES PATENT OFFICE.

JOHN ROSWELL ENOS, OF PEABODY, MASSACHUSETTS.

IMPROVEMENT IN MODES OF TANNING HIDES.

Specification forming part of Letters Patent No. 133,021, dated November 12, 1872.

*To all whom it may concern:*

Be it known that I, JOHN ROSWELL ENOS, of Peabody, Essex county, State of Massachusetts, have invented a new and Improved Mode of Tanning Hides; and I do hereby declare that the following is an exact and full description of the same.

Nature and Object of the Invention.

The nature of my invention is that of treating the extract of hemlock bark, or other tannin-containing extract, by mixture with certain substances which expedite and perfect the solution of the inspissated or thick liquid extract, which substances also, by their joint chemical action, keep the whole mass in a state of molecular motion, by which a bleaching action which takes place upon the colored tannin extract and the hides is assisted, and a more complete permeation of the hides by the dissolved tannin extract is effected; and the object is to expedite the process of tanning hides, and to make them of lighter color than has been heretofore practiced, with equally strong liquors.

Description of the Invention.

I take one hundred pounds of the commercial extract of hemlock, or oak extract, or gambia or cutch, (the latter two having been dissolved, as is practiced with tanners,) which article is in a liquid state of various degrees of the barkometer, and, placing it in a vessel, I mix in another vessel five pounds of pulverized sulphur, five pounds of sumac, and five pounds of chalk or whiting. I then add this mixture to the tannin extract, stirring the whole thoroughly. I then add five quarts of vinegar of ordinary commercial strength (or dissolved acetic acid of the same degree Baumé) to the mixture last named, and, after stirring thoroughly, pour the whole into the tanning-vat. I then add one-half a bushel of dissolved salt to the whole. The liquor should be kept a little salted all through the process, salt being added from time to time, as much as may be necessary to give the liquor a slightly saline taste.

In treating two hundred pounds of extract of gambia or of cutch I use double the amount hereinbefore named of sulphur, chalk, sumac, and vinegar, but no more salt.

After this liquor has been used for tanning for, say, two days, in making new liquor I dispense with fifty per cent. of the vinegar hereinbefore mentioned, using instead thereof two or three bucketfuls of the spent liquor.

After the first part of hides is tanned I take two or three skimmerfuls of dregs from the bottom of the vat, and, adding to the mass one-half the hereinbefore-mentioned portions of sulphur, chalk, sumac, and vinegar, I stir the whole mass well and mix it thoroughly with the above-mentioned weight of tannin extract, and then pour the whole into the tanning-vat.

For upper leather the liquor should be of from 15° to 22° strength. For sole-leather the strength of the liquor should be the same until the hide is nearly tanned, when the vat should be filled up with liquor of the strength of from 25° to 30°.

Hides will be tanned in this preparation in from fifteen to twenty-five days.

Operation of the Invention.

The effect of this treatment is that, first, when extract of hemlock bark is used, with the processes practiced heretofore, an objectionable dark color is given to the hide if strong liquor is used, while with my process no darker color is given with 25° liquor, which tans quickly, than with 10° liquor, which takes much more time to operate; second, the tannin extract is wholly dissolved, and therefore all the tannin is made useful, thus economizing the tannin extract, and therefore the cost of tanning the leather; third, the tannin extract, being thus fully dissolved and diluted, enters more readily into the pores of the hide, and thus produces in a short time the effect upon the fibers of the leather which in other modes of practice takes a much longer time, so that hides which require in the old modes of practice three months to tan are tanned by my method in fifteen to twenty-five days' time, thus saving interest and economizing capital; fourth, the action of the application of tannin extract of, say, 25° to raw hide is at first strongly upon the surface, and that to such an extent as to harden this surface and prevent the access of the tannin to the interior portion of the hide; but with my process I use without prejudice 25° liquor, and thus expedite the tanning.

I consider the rationale of my process, so far as I have at present theorized about it, to be this: The acetic acid combines with the lime of the chalk and liberates its carbonic acid, which latter causes an effervescence in the dissolving extract and a minute subdivision of the same, so that it is better fitted to permeate the pores of the hide. It causes also a thorough mixture of the liquid with the pulverized sulphur, which latter bleaches the coloring-matter of the extract. The acetate of lime formed also bleaches, like the sulphur, both the hide and the extract. The effect of the sumac is to make the mixture of extract, &c., more of an emollient nature, to soften the leather, and, as its coloring-matter is lighter than that of the extracts used, I obtain its tannin without a prejudicial darkening of my leather; but I do not consider the use of sumac essential.

I do not limit myself to the exact proportions mentioned of the chemicals and the tannin extract.

I claim—

The treatment of tannin extract, for the purpose of tanning hides, by its mixture with sulphur, chalk, vinegar, and common salt, in the proportions and in the manner substantially as described.

JOHN ROSWELL ENOS.

Witnesses:
LEMUEL P. JENKS,
JEROME DAVIS.